United States Patent
Sohrweide et al.

(10) Patent No.: US 11,223,693 B1
(45) Date of Patent: Jan. 11, 2022

(54) SYSTEM, METHOD, AND COMPUTER PROGRAM FOR AGGREGATING CHANNEL AGNOSTIC DATA

(71) Applicant: Amdocs Development Limited, Limassol (CY)

(72) Inventors: Deborah A. Sohrweide, San Jose, CA (US); Alan Palmer Stephens, Austin, TX (US); Sanjay Gupta, Pune (IN); Andrew Harper, Roswell, GA (US); Alma D. Lopez, San Jose, CA (US); Ksheerasagar Akella, Sunnyvale, CA (US); Manish Rustagi, Fremont, CA (US); Amresh Vaidya, Virginia Beach, VA (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 271 days.

(21) Appl. No.: 15/820,189

(22) Filed: Nov. 21, 2017

(51) Int. Cl.
*G06F 15/173* (2006.01)
*H04L 29/08* (2006.01)
*G06Q 30/02* (2012.01)

(52) U.S. Cl.
CPC ......... *H04L 67/22* (2013.01); *G06Q 30/0261* (2013.01)

(58) Field of Classification Search
CPC .............................. H04L 67/22; G06Q 30/0261
See application file for complete search history.

(56) References Cited

U.S. PATENT DOCUMENTS

| | | | |
|---|---|---|---|
| 5,914,951 A | 6/1999 | Bentley et al. | |
| 6,564,227 B2 | 5/2003 | Sakakibara et al. | |
| 6,865,546 B1* | 3/2005 | Song ................. | G06Q 10/1093 705/14.35 |
| 9,667,788 B2 | 5/2017 | Conway et al. | |
| 10,069,938 B1* | 9/2018 | Zhang .................... | H04L 67/42 |
| 2004/0172481 A1* | 9/2004 | Engstrom ............. | G06Q 30/02 709/239 |
| 2013/0317993 A1 | 11/2013 | Wasserman et al. | |
| 2014/0254434 A1* | 9/2014 | Jain ........................ | H04W 8/20 370/259 |

OTHER PUBLICATIONS

Ericsson, "Ericsson User Data Consolidation," 2017, pp. 1-7, retrieved from https://www.ericsson.com/ourportfolio/digital-services-products/user-data-consolidation?nav=productcategory022%7Cfgb_101_147.
Oracle, "Integrating with Communications Billing Systems: A CRM for Communications Solution," Jan. 2003, pp. 1-24, as retrieved from http://www.oracle.com/US/media/056952.pdf.

(Continued)

*Primary Examiner* — Hua Fan
(74) *Attorney, Agent, or Firm* — Zilka-Kotab, P.C.

(57) ABSTRACT

A system, method, and computer program product are provided for aggregating channel agnostic data. In use, channel agnostic data is received, at a messaging bus, from a plurality of telecommunication system sources, wherein the plurality of telecommunication system sources is channel agnostic. Next, using a micro service, the channel agnostic data is aggregated from the plurality of telecommunication system sources and the aggregated channel agnostic data is presented, on demand, based on at least one of authority, needs, and preferences. Further, at least one action is associated with the aggregated channel agnostic data.

15 Claims, 6 Drawing Sheets

(56) References Cited

OTHER PUBLICATIONS

Sprout Social, "Social Media Management Tools to Power Communication," 2017, pp. 1-9, as retrieved from https://sproutsocial.com/social-media-management.

Hootsuite, "Monitoring: Social Media Marketing & Management Dashboard," 2017, pp. 1-6, retrieved from https://hootsuite.com/platform/monitoring.

Mason, M.," New Botkit integration makes deploying Watson bots to messaging apps easy," IBM, Nov. 5, 2016, pp. 1-8, retrieved from https://www.ibm.com/blogs/watson/2016/11/new-botkit-integration-makes-deploying-watson-bots-messaging-apps-easy/.

* cited by examiner

SYSTEM, METHOD, AND COMPUTER PROGRAM FOR AGGREGATING CHANNEL AGNOSTIC DATA

FIELD OF THE INVENTION

The present invention relates to collecting information, and more particularly to aggregating information associated with a customer.

BACKGROUND

Modern communication systems focus regularly on capturing information associated with customers. For example, interactions at a reoccurring location (e.g. café bar, etc.) may indicate to the communication system to serve relevant ads and coupons associated with such reoccurring location. A similar type analogy could equally apply to digital type locations. Tailoring the plethora of services to a customer therefore requires gathering customer-specific information, where such customer-specific information may include time, place, location, duration, and/or any other details associated with a customer drive event. However, gathering all of this information often occurs on an individual basis from each gathering source, causing an inefficient use of processors, service providers, and system resources.

There is thus a need for addressing these and/or other issues associated with the prior art.

SUMMARY

A system, method, and computer program product are provided for aggregating channel agnostic data. In use, channel agnostic data is received, at a messaging bus, from a plurality of telecommunication system sources, wherein the plurality of telecommunication system sources is channel agnostic. Next, using a micro service, the channel agnostic data is aggregated from the plurality of telecommunication system sources and the aggregated channel agnostic data is presented, on demand, based on at least one of authority, needs, and preferences. Further, at least one action is associated with the aggregated channel agnostic data.

In a first embodiment, the aggregated channel agnostic data may include both real-time data and historical data. Additionally, the presenting may include filtering the aggregated channel agnostic data and prioritizing the aggregated channel agnostic data. Further, the presenting may be both channel agnostic and consumer agnostic.

In a second embodiment (which may or may not be combined with the first embodiment), the plurality of telecommunication system sources may include at least one of an internal system or external system.

In a third embodiment (which may or may not be combined with the first and/or second embodiment), the at least one action may be based on a trigger, and may be customized. Additionally, the at least one action may include constructing a single feed response, where the single feed response may be invoked by a single REST request. Moreover, the single feed response may include channel agnostic data from at least two of the plurality of telecommunication system sources. As an option, a feed associated with the micro service may be constructed via a single REST request.

In a fourth embodiment (which may or may not be combined with the first, second and/or third embodiment), the micro service may record one or more interactions between a service provider and a customer, and may manage feed items for quick display of specific interactions associated with a customer. Additionally, the micro service may be connected to a local persistence store that is populated by events published to the micro service. Further, the events may originate from an external system.

DETAILED DESCRIPTION

Figure 1:
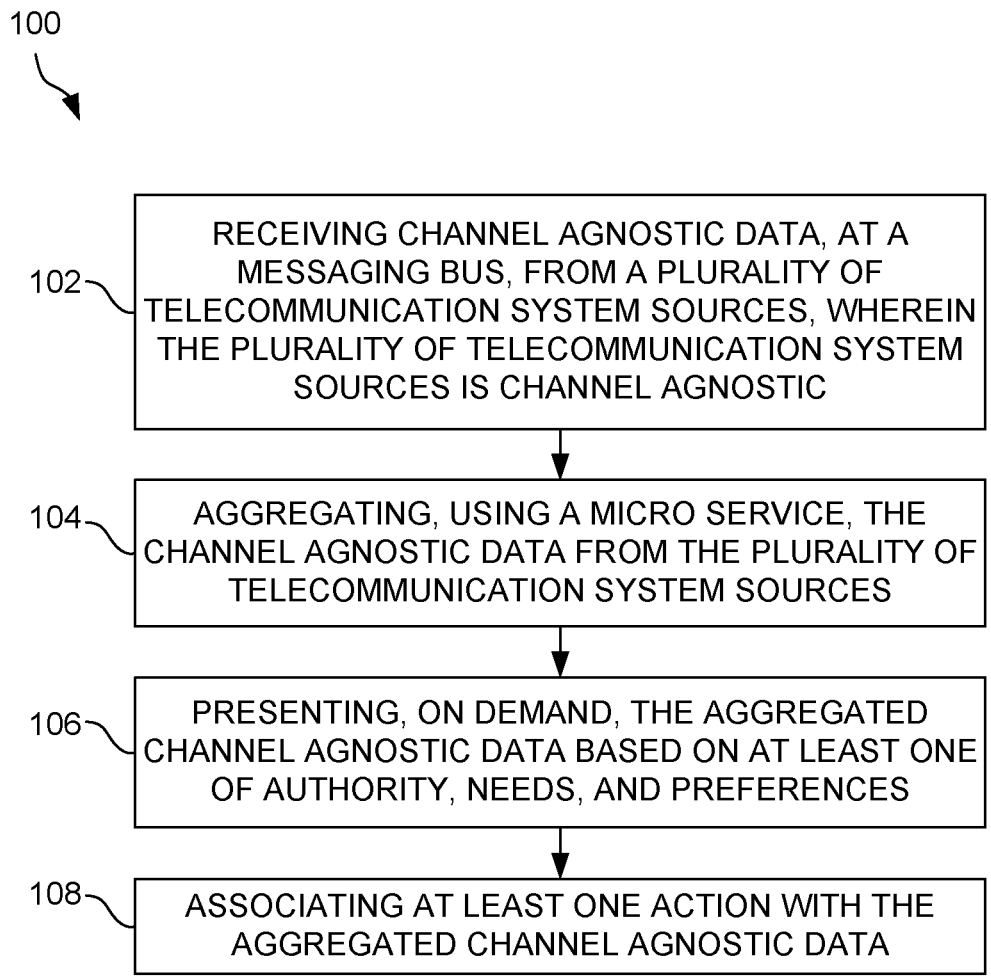
FIG. 1 illustrates a method for associating at least one action with aggregated channel agnostic data, in accordance with one embodiment.

FIG. 1 illustrates a method 100 for associating at least one action with aggregated channel agnostic data, in accordance with one embodiment. As shown, channel agnostic data is received at a messaging bus, from a plurality of telecommunication system sources, wherein the plurality of telecommunication system sources is channel agnostic. See operation 102. In the context of the present description, channel agnostic refers to a source which has the capacity to operate without requiring any special adaptation. In like manner, channel agnostic data is any data originating from a channel agnostic source.

As an example, the messaging bus may be used to collect data from a variety of both internal and external sources and transport/communicate such data to an appropriate destination (e.g. data store, application, micro service, etc.). In various embodiments, the plurality of telecommunication system sources may include at least one of an internal system or an external system that sends (e.g. or publishes) data to the messaging bus. For example, sending data to the messaging bus may include addressing one or more messages directly to the messaging bus. In another embodiment, the messaging bus may be used to listen for any communication (from the plurality of telecommunication system sources, etc.) which may be relevant (e.g. to a customer, etc.). As such, the messaging bus may be used to receive pushed data (from a source that sends such data) or may be used to pull data (requesting updates/data from a source) from the plurality of telecommunication system sources. Further, data may be received (or requested) of a third-party aggregation service that remains anonymous to the messaging bus but which provides data from other external sources. Additionally, the messaging bus may include a queue for data (e.g. data that is being received at the messaging bus). In this manner, the messaging bus may be active (in collecting data) and/or reactive (responding to data that is sent/addressed to the messaging bus).

In one embodiment, the messaging queue may be restricted and/or made private (e.g. not available to the public, etc.). In other embodiments, the plurality of telecommunication system sources may include internal systems such as, but not limited to, billing, CRM, case management (e.g. a case opened in response to a detected issue or in response to a customer interaction, etc.), order management (e.g. fulfillment of services or products ordered, etc.), and/or other relevant sources. Further, the plurality of telecommunication system sources may include external systems that provide content from social connections which may be relevant to customers. With respect to such external systems, external data may remain stored on an external source (e.g. especially if the content is marked private or non-public), but the messaging bus may create a relevancy task note (e.g. customer displeased with latest billing, etc.) which may further influence later generated actions. For example, a service agent may view a correspondence of a customer on a third-party external source and create an internal case object describing the third-party interaction. In this manner, content of the third-party external may remain private and separate from data items that are created on an internal system and then received at the messaging bus.

Further, a data object may correspond with any of the data received. For example, a case within a case management telecommunication system source may include a customer object such that any reporting on the case is associated with a particular customer.

Still yet, the messaging bus may serve as a communication hub for receiving messages. To this effect, a consumer, service (e.g. microservice, etc.), or other end-source may subscribe to any or all of the messages being received at the messaging bus. The messaging bus acts therefore as a hub between one or more sources and end subscriber recipients. In one embodiment, after data is received at the messaging bus, an analysis may be conducted to determine relevancy of the data to a particular end recipient (e.g. customer, subscriber, etc.) or case file (e.g. information pertinent to a known customer, etc.).

Additionally, using a micro service, the channel agnostic data is aggregated from the plurality of telecommunication system sources. See operation 104. In the context of the present description, a micro service is a lightweight and independent modular service that is capable of communicating with other modular services using standard protocols. For example, a micro service may include an ability to manage or handle customer interactions, orders, shipments, translation, push notifications, coverage, etc.

In one embodiment, the aggregated channel agnostic data may include both real-time data and historical data. Additionally, the micro service may record one or more interactions between a service provider and a customer. The micro service may also manage feed items for quick display of specific interactions associated with a customer. For example, such feed items may relate to data determined to be "high priority" based on an analysis of the incoming data.

The micro service may be connected to a local persistence store that is populated by events published to the micro service. In one embodiment, the local persistence store may be located on an internal network system associated with the micro service. In another embodiment, a persistence store may be located remote (e.g. cloud, external server or database system, etc.) from the micro service. Additionally, the events may originate from either an internal or an external system.

Further, the aggregated channel agnostic data is presented, on demand, based on at least one of authority, needs, and preferences. See operation 106. For example, an authority tag of a user may relate to a user's title (e.g. manager, customer, service agent, etc.) which may be used to restrict what information is presented. In like manner, a needs tag of a user may relate to an administrative access to data (e.g. full access, partial access, geographic restriction, etc.). Lastly, the presentation may be restricted and filtered based on a preference of a user.

In one embodiment, the presenting the aggregated channel agnostic data may include a filter. For example, a filter may restrict that which is displayed, including a restriction based on a source of data (e.g. billing, social, CRM, etc.), type of data (e.g. internally obtained data, externally obtained data, social media related, customer management related, etc.), etc. In this manner, the presenting may include dynamic capabilities (i.e. personalization of the presentation).

Additionally, the presenting the aggregated channel agnostic data may include filtering the aggregated channel agnostic data and/or prioritizing the aggregated channel agnostic data. Further, the presenting may be both channel agnostic (e.g. input source) and consumer agnostic (e.g. output source).

In addition, at least one action is associated with the aggregated channel agnostic data. See operation 108. For example, the at least one action may include constructing a report/message, generating a summary, presenting a display, notifying a party (e.g. management team, etc.), etc. In one embodiment, the at least one action may be based on a trigger (e.g. geolocation, time, date, input of particular data that is recognized, etc.). Additionally, the at least one action may be customized. For example, the action may be modified to achieve a desired output (e.g. report, notification, etc.).

Additionally, the at least one action may include constructing a single feed response. Such single feed response may be invoked by a single REST request. In one embodiment, the single feed response may include channel agnostic data from at least two of the plurality of telecommunication system sources. Additionally, a feed associated with the micro service may be constructed via a single REST request.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
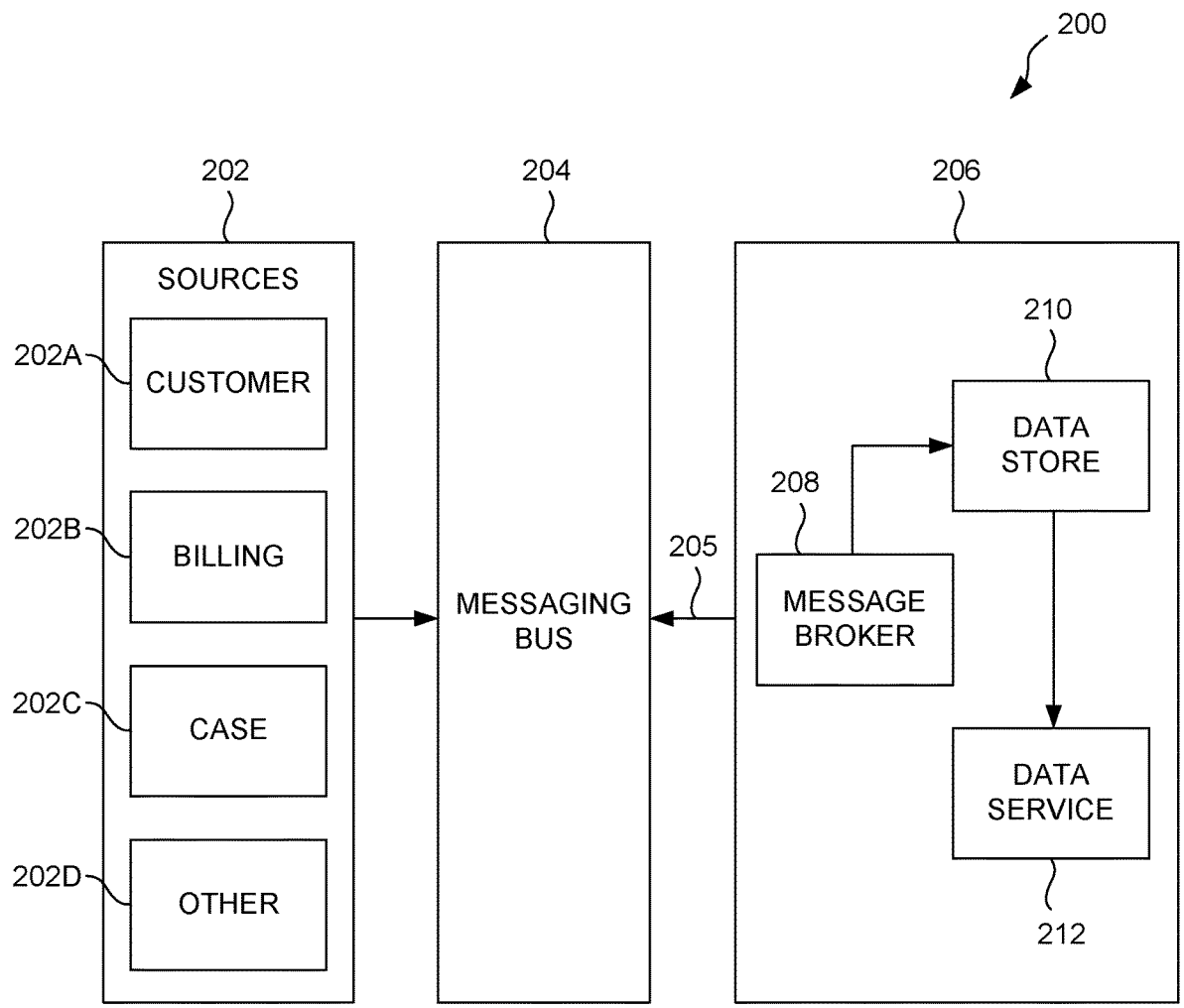
FIG. 2 illustrates a system architecture for aggregating channel agnostic data, in accordance with one embodiment.

FIG. 2 illustrates a system architecture 200 for aggregating channel agnostic data, in accordance with one embodiment. As an option, the system architecture 200 may be implemented in the context of any one or more of the embodiments set forth in any previous and/or subsequent figure(s) and/or description thereof. Of course, however, the system architecture 200 may be implemented in the context of any desired environment. Further, the aforementioned definitions may equally apply to the description below.

As shown, sources 202 include a plurality of possible sources such as a customer module 202A, a billing module 202B, a case management module 202C, and other sources 202D. Of course, sources 202A, 202B, 202C, and 202D are intended merely as examples and are not intended to be limiting in any manner. Any source, whether external or internal, and any number of sources, may be connected to messaging bus 204. The sending of data may be in response to sources 202 pushing such data to messaging bus 204. In another embodiment, messaging bus 204 may pull (request) such data from sources 202.

The sources 202 may function as a producer to the system architecture 200. For example, any source system that may have some form of interaction with a customer may thereby act as a potential producer of events for system architecture 200. As indicated hereinabove, these producers may include both internal sources (e.g. including core internal systems such as CRM, ordering, billing, user customized space, etc.), as well as external systems (e.g. third-party systems, store appointment reminders, scheduling technicians, etc.).

Additionally, activity feed 206 includes subscribing 205 to the messaging bus 204. The activity feed 206 includes message broker 208, data store 210, and data service 212. The subscribing 205 may include receiving all messages received at the messaging bus, and/or a subset (e.g. having a filter applied the messages) of the messages. Additionally, the message broker 208 may receive such messages and send any received message to the data store 210 for persistent storing. As indicated hereinabove, such storing may be local or remote. Further, the data service 212 may include one or more micro services used to take an action on data received at the message broker 208 and stored at the data store 210.

Still yet, message broker 208 may be used to listen, consume, and process the messages from messaging bus 204 and which are then stored in data store 210. Additionally, data store 210 may function as a database that includes all events about user interactions and activities. In this manner, data service 212 may be used to retrieve events for a specific customer based on data that is identified by the message broker 208 and saved in the data store 210.

The data store 210 may be queried by a data service 212 (or micro service, widget, etc.) to retrieve feed items for a customer. Such an operation may retrieve relevant values from the persistent storage of the microservice. Additionally, data store 210 may store essential data needed to populate a corresponding user interface (UI) for each item (e.g. event details, event date/time, etc.). Further, a location attribute (e.g. href) may be used to access the details of an item, if available.

In one embodiment, the activity feed 206 may combine notifications of interest to a particular customer into a single stream for display. Additionally, data items that are stored at the data store 210 may include a data state, such as "now" (meaning current within a set timeframe), data items that were received in some previous time in recent history (based on a set time frame window), etc.

The activity feed 206 may also function as a container for other existing widgets and self-rendering components. Additionally, the activity feed 206 may be used to implement preset parameters to present received data in a user interface data feed (e.g. with updates based on the aggregated data), or may be used to invoke a solitary REST request to retrieve other notifications.

Moreover, the activity feed 206 may include a set of self-rendering components which may display a brief description of an event (e.g. data event), a date, and any relevant event details. Such components may be received from one or more back-end systems. In such an example, rather than invoking a REST for each item of interest, the distinct events from the back-end may be consolidated into a single feed REST request managed by the activity feed 206.

In one embodiment, the activity feed 206 may be used to display the aggregated channel agnostic data. Additionally, the activity feed 206 may be used to pull information from sources (e.g. external sources, internal sources, etc.) as well as present the aggregated channel agnostic data (e.g. personalizing the presenting based on the user/system accessing the aggregated channel agnostic data, etc.). For example, a CRM database user may be able to view information relating to any of the system's customers, whereas a customer may only be able to view information relating specifically to the customer's account. In this manner, the type of user (e.g. manager, customer, etc.) accessing may dictate the extent of data aggregated channel agnostic data that is presented. Still yet, the activity feed 206 may provide real-time live data (e.g. as information is received at the messaging bus), as well as historical data.

As indicated above, the data service 212 may include one or more micro services. Such micro services may include one or more of (but not limited to): offer recommendation (present an upgrade offer based on analytics), top item (present a top promotional item from a catalog), etc. Further, the aggregated data may be saved together as an event (e.g. grouped data based on common date or other common feature, etc.). In one embodiment, the event may be a self-rendering entity such as, but not limited to, "problem/case updated," "problem/case status change," "postpaid bill due," "prepared balance low/expiring," "allowance limits nearing," and/or any other pre-configured label.

In one embodiment, an event may provide supply a unique object to encapsulate data specific to that event. In this manner, fields in each object (e.g. eventDetails object, etc.) may vary according to the contents of that particular event. A common element for each event may include a location (e.g. href) field which may allow a consumer to query the details of the object directly. Of course, if there is no mechanism for querying the details of a particular object, then the href field may be left blank. Other attribute fields of an event may include, but not be limited to, "id," "eventDate," "eventType," "eventSubType," "customerID," and "eventData."

The activity feed 206 may be used to record interactions between a service provider (e.g. such as one of sources 202, etc.) and a customer, subscriber, and/or user. Initially, the activity feed 206 may be used to manage feed items for quick display/retrieval of specific interactions for a customer.

Still yet, the activity feed 206 may be used to provide a complete (360 degree) view of a customer that can be used to populate a feed widget (or micro service, etc.) in a customer management user interface. Additionally, activity feed 206 may be used to store essential data (e.g. in the data store 210) to populate a minimalist view of various interactions, as well as a mechanism for accessing the full view of interactions. To accomplish this, the activity feed 206 may include a local persistence store (e.g. data store 210) that may be populated by events published to the micro service. By collecting data in this fashion, a date-ordered feed may be constructed by invoking a single REST, rather than querying each back-end system one at a time for each item of interest.

The activity feed 206 may be used to publish data which may be imported by micro services and/or widgets. In one embodiment, data may remain unpublished due to privacy settings (e.g. associated with the micro service, associated with the data aggregated and/or receive, etc.).

Figure 3:
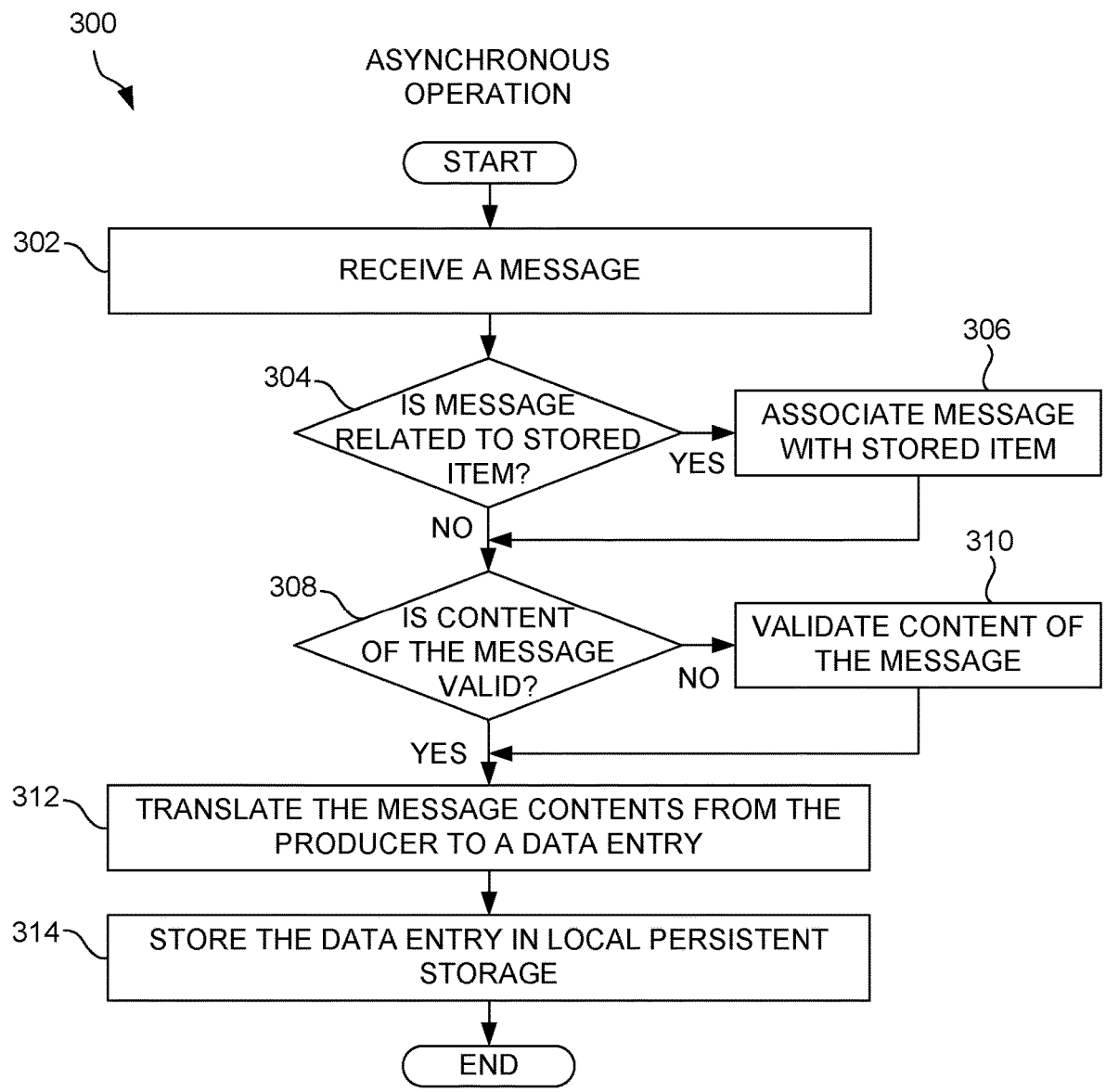
FIG. 3 illustrates an asynchronous operation for aggregating channel agnostic data, in accordance with one embodiment.

FIG. 3 illustrates an asynchronous operation 300 for aggregating channel agnostic data, in accordance with one embodiment. As an option, the asynchronous operation 300 may be implemented in the context of any one or more of the embodiments set forth in any previous and/or subsequent figure(s) and/or description thereof. Of course, however, the asynchronous operation 300 may be implemented in the context of any desired environment. Further, the aforementioned definitions may equally apply to the description below.

As shown, the asynchronous operation 300 begins with receiving a message. In one embodiment, the message may include Kafka (apache) message. In particular, sources (e.g. sources 202) may function as producers and create and publish messages (e.g. Kafka) to the activity feed 206 (and more specifically, as stored and populated within data store 210).

Next, it is determined per decision 304 if the message is related to a stored item. If yes, then per operation 306, the message is associated with a stored item. For example, a message received may relate to a customer, in which case the data may be associated with the customer object. If no to decision 304 (or after completing operation 306), then decision 304 proceeds to decision 308 where it is determined if the content of the message is valid. In one embodiment, a valid message may include providing all required fields, providing a valid date, providing a valid event type/subtype, etc. Of course, any specified field may be used to validate the received message. If the message is not valid, then the message may be rejected (e.g. sent back to the originating source, etc.). In another embodiment, the message may be validated per operation 310, wherein validating may include correcting one or more determined validity deficiencies.

If yes to decision 308 (or after completing operation 310), then decision 308 proceeds to operation 312 where the message contents are translated from the producer to a data entry (e.g. feeditem object, etc.). For example, the data received may be in a particular format from the producer, and the translation step may include transforming the data into standard form (e.g. feed item object). Lastly, per operation 314, the data entry is stored in local persistent storage.

Additionally, producers may create a message in a pre-configured format (e.g. Kafka, etc.) natively. In some instances, the message may be received from a producer in a set format. For example, a CRM module may register and publish "data change events" for state changes in a specific customer object. A billing module may use a "transaction broker" to exchange events between billing subsystems. As such, in such instances, a micro service may need to include an adapter to transform or translate (per operation 312) the message from a first format to standard format used by the activity feed (e.g. 206). Once translated, in one embodiment, the micro service adapter may then publish the messages to be consumed by an appropriate micro service for further action.

In one embodiment, a consumer of the message (e.g. message received via operation 302) may include a micro service. Additionally, a data entry (e.g. feed item) may be created and used as an input to such micro service (e.g. for further servicing and/or actions, etc.).

Figure 4:
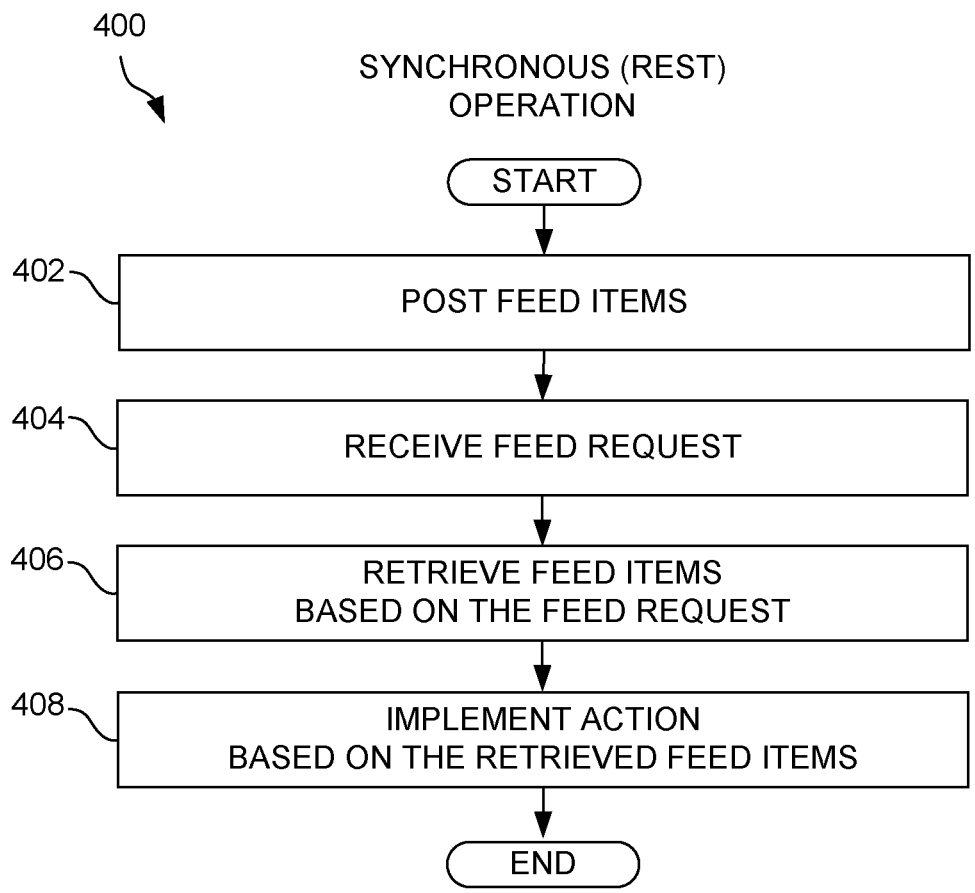
FIG. 4 illustrates a synchronous operation for aggregating channel agnostic data, in accordance with one embodiment.

FIG. 4 illustrates a synchronous operation 400 for aggregating channel agnostic data, in accordance with one embodiment. As an option, the synchronous operation 400 may be implemented in the context of any one or more of the embodiments set forth in any previous and/or subsequent figure(s) and/or description thereof. Of course, however, the synchronous operation 400 may be implemented in the context of any desired environment. Further, the aforementioned definitions may equally apply to the description below.

As shown, feed items are posted. See operation 402. As described hereinabove, posting feed items may include receiving data at the messaging bus 204. Next, a feed request is received per operation 404. For example, a feed request may include an operation such as a feed item, an event feed item, an online feed item, etc.

A feed item may include a collection of all feed items for a customer, including consolidating any event and/or online items into one return stream. In this manner, the feed item may include a collection of details relating to a feed item. In one embodiment, results contained within the feed item may be sorted based on a flag of an item (e.g. overdue bill, an allowance over a limit, etc.), an event date, etc.

An event feed item may include a collection of feed items for a customer for events that occurred at some point in the past. Additionally, an online feed item includes a collection of feed items for a customer which are retrieved from various back-end systems instead of from a local persistence layer. Such online feed items may include a current state (e.g. bill due, allowances nearing or over limits, etc.). Further, for both the event feed item and the online feed item, results may be sorted based on filters (e.g. state, status, date, etc.).

Next, feed items are retrieved based on the feed request. See operation 406. In one embodiment, the feed items are retrieved using a GET request. Additionally, an aggregation of feed items associated with the feed request may be retrieved. Lastly, an action is implemented based on the retrieved feed items per operation 408. For example, after retrieving feed items, the action may include notifying a user (e.g. customer, service agent, etc.), displaying an aggregation of the feed items, automatically taking steps to rectify an issue identified in the feed items, etc.

Additionally, as described herein, the feed items may include both recent and historical data. Such feed items may reflect a current state (e.g. bill due, allowances nearing or over limits, etc.). Moreover, the feed items may be verified for the following items (but not limited to): postpaid bill due (or nearing due date), prepaid buckets below a certain currency threshold, prepaid buckets expiring within a certain threshold, allowances nearing (or over a certain threshold), etc.

In various embodiments, the aggregating of channel agnostic data may include determining if a received data item (e.g. received at messaging bus 204, etc.) is based on an interaction of services external to the system. For example, a social agent may identify that a customer (using a third-party system) is having a social interaction relating to a service provided by the communication company. The social agent may create a log of the event associated with the customer, and if such customer later calls the communication company, such company can determine that the prior social interaction resulted in an escalation to the company's call center for support. In this manner, the aggregating of channel agnostic data may provide a more complete picture of the customer's interaction.

Further, the aggregating of channel agnostic data may focus on interactions between a customer and a company (e.g. company employee, company services, etc.), including receiving data relating to the customer from a variety of sources (e.g. sources 202, etc.) including but not limited to social channels, live agent chats, retail stores, virtual agent conversations, etc.

As a further example of how the aggregation of channel agnostic data may be used, a customer may receive a bill for telecommunication services and then may contact the services providing business questioning an element of the bill. The CRM service associated with the business may create a case report associated with the bill and the customer, and such information may then be provided (either pushed by the CRM service or pulled by the system) to the messaging bus. Additionally, such customer may further comment on the bill in social media stream (e.g. twitter, facebook, etc.) and such external information may, in like manner (push or pull), be provided to the messaging bus. As such, information may be obtained from a variety of sources (e.g. CRM service, social media, etc.), and aggregated using the messaging bus. A microservice may then obtain such information from the messaging bus and determine relevancy of the data to a particular customer account. Additionally, such aggregated information may then be sent out (according to preset parameters) to a case management system (to resolve the case) or to any other end point.

In various embodiments, the aggregating of channel agnostic data may permit capturing of all interactions a customer may have with internal and/or external systems. For example, various internal systems may include, but not be limited to, billing, CRM, case management, etc. and a customer may have some interactions with one or more of such internal systems. Additionally, a customer may have further interactions with a third party (e.g. communication complimenting/disapproving of an action of the service, etc.) and such interaction may additionally be aggregated. In this manner, a feed associated with the customer may then be displayed containing all relevant activities associated with the customer. Of course, any and all events from any source may be aggregated by the system, and such events may be further filtered and refined such that events that are relevant or similar (e.g. billing management, customer satisfaction, etc.) may be grouped together.

In another embodiment, the current method and system may be used to decrease processing time and increase processor efficiency. For example, conventional systems may require collecting data from individual sources where in order to show all interactions, each source may be individually contacted. In the current system, only the activity feed (e.g. via the micro service) is contacted where aggregated information can then be provided in response to the request. In this manner, more efficient use of processors is achieved and processing time to deliver results is reduced as only one source (the aggregation service) may need to be contacted.

Figure 5:
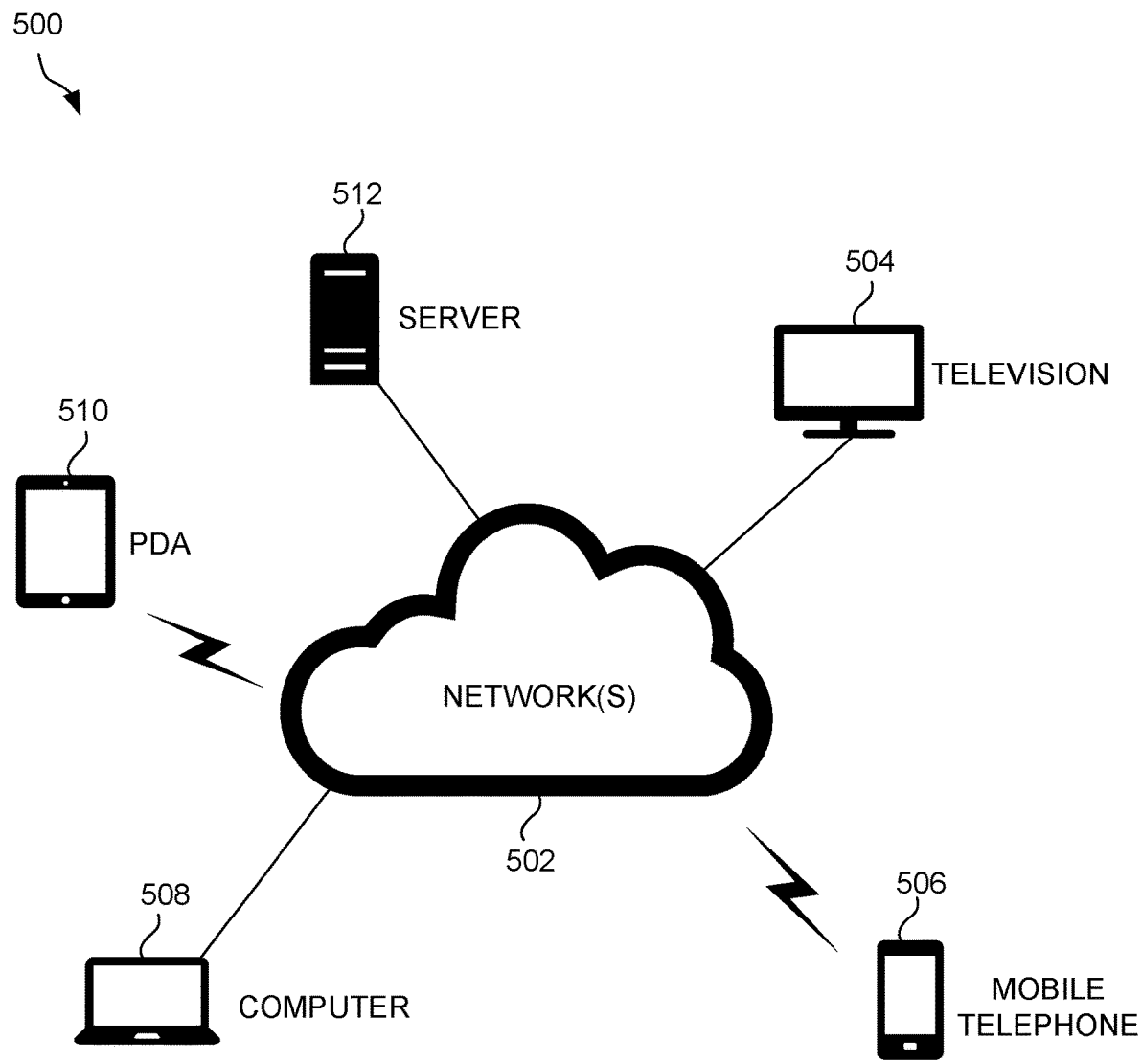
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
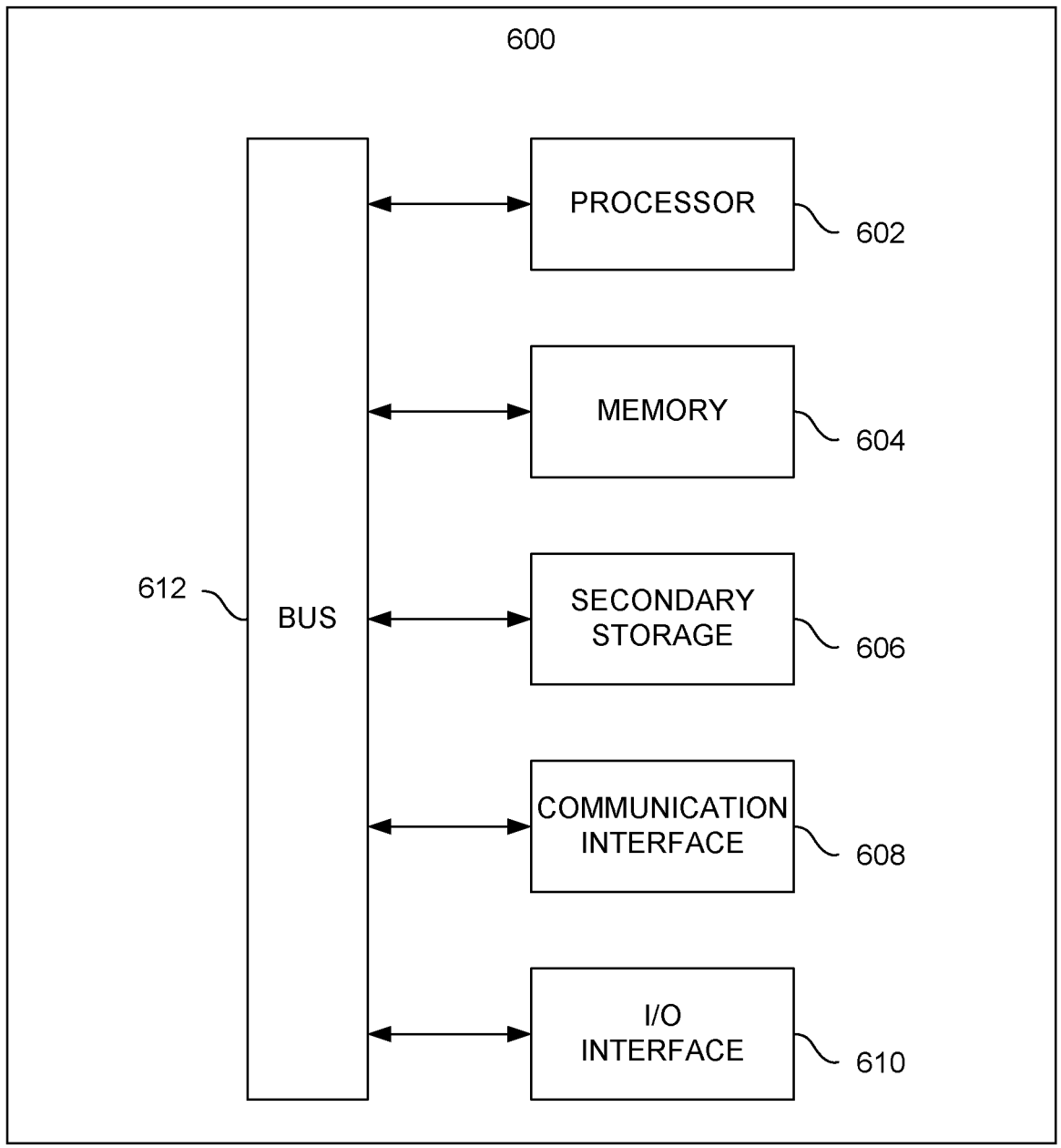
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 602 which is connected to a communication bus 612. The system 600 also includes main memory 604 [e.g. random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, storage 606 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer implemented method, comprising:
   receiving, by a messaging bus of a system from each telecommunication system source of a plurality of telecommunication system sources that are channel agnostic, channel agnostic data indicating interactions between a first customer and the telecommunication system source;
   storing, by the system in a data store, the channel agnostic data received from each telecommunication system source of the plurality of telecommunication system sources, the channel agnostic data being stored in association with an identifier of the first customer;
   querying, by the system, the data store with the identifier of the first customer to retrieve the channel agnostic data received from each telecommunication system source of the plurality of telecommunication system sources that is associated with the first customer;
   determining, by the system, a customer management-related end user to which the activity feed is to be displayed;
   determining, by the system, an authority tag of the end user;
   determining, by the system, which channel agnostic data retrieved from the data store is accessible to the end user, based on the authority tag of the end user;
   generating, by the system, an activity feed that aggregates the channel agnostic data retrieved from the data store that is accessible to the end user,
   wherein the retrieved channel agnostic data is sorted within the activity feed based on at least one of flagged items or event dates;
   causing display, by the system on demand in a customer management user interface, of the activity feed to the end user; and
   implementing, by the system, at least one action based on the retrieved channel agnostic data, the at least one action including automatically taking steps to rectify an issue identified in the activity feed.

2. The computer implemented method of claim 1, wherein the plurality of telecommunication system sources includes at least one of an internal system or external system.

3. The computer implemented method of claim 1, wherein the plurality of telecommunication system sources includes:
   internal systems including a customer relationship management (CRM) system, an ordering system, and a billing system, and
   external systems including social channels, live agent chats, and virtual agent conversations.

4. The computer implemented method of claim 1, wherein the activity feed provides real-time live data as it is received at the messaging bus as well as historical data.

5. The computer implemented method of claim 1, further comprising using the activity feed to populate a feed widget in customer management user interface.

6. The computer implemented method of claim 1, wherein the activity feed is generated by invoking a single REST service operation to query the data store.

7. The computer implemented method of claim 1, further comprising prior to storing the first channel agnostic data in the data store:
   validating the channel agnostic data received from each telecommunication system source of the plurality of telecommunication system sources to determine whether the content of each message of the channel agnostic data is valid, and
   correcting one or more deficiencies determined from the validating.

8. The computer implemented method of claim 7, wherein determining whether the content of each message of the channel agnostic data is valid includes determining whether the message provides all required information, the required information including a valid date and valid event type.

9. The computer implemented method of claim 7, further comprising after validating the channel agnostic data and prior to storing the channel agnostic data in the data store:
   translating the content of each message of the channel agnostic data into a standard form, wherein the standard form includes a feed item object.

10. The computer implemented method of claim 1, wherein aggregating the channel agnostic data further includes grouping together events that are similar.

11. The computer implemented method of claim 1, wherein the authority tag relates to a title of the end user that restricts which channel agnostic data retrieved from the data store is accessible to the end user.

12. The computer implemented method of claim 11, wherein the title of the end user is one of a manager or a service agent.

13. The computer implemented method of claim 1, wherein the activity feed displayed to the end user provides a view of at least a portion of the interactions between the first customer and the plurality of telecommunication system sources.

14. A computer program product comprising computer executable instructions stored on a non-transitory computer readable medium that when executed by a processor of a system instruct the processor to:
   receive, by a messaging bus of a system from each telecommunication system source of a plurality of telecommunication system sources that are channel agnostic, channel agnostic data indicating interactions between a first customer and the telecommunication system source;
   store, by the system in a data store, the channel agnostic data received from each telecommunication system source of the plurality of telecommunication system sources, the channel agnostic data being stored in association with an identifier of the first customer;
   query, by the system, the data store with the identifier of the first customer to retrieve the channel agnostic data received from each telecommunication system source of the plurality of telecommunication system sources that is associated with the first customer;
   determine, by the system, a customer management-related end user to which the activity feed is to be displayed;
   determine, by the system, an authority tag of the end user;
   determine, by the system, which channel agnostic data retrieved from the data store is accessible to the end user, based on the authority tag of the end user;
   generate, by the system, an activity feed that aggregates the channel agnostic data retrieved from the data store that is accessible to the end user,
   wherein the retrieved channel agnostic data is sorted within the activity feed based on at least one of flagged items or event dates;
   cause display, by the system on demand in a customer management user interface, of the activity feed to the end user; and
   implement, by the system, at least one action based on the retrieved channel agnostic data, the at least one action including automatically taking steps to rectify an issue identified in the activity feed.

15. A system, comprising:
   a non-transitory memory storing instructions; and
   one or more processors in communication with the non-transitory memory, wherein the one or more processors execute the instructions to:
   receive, by a messaging bus of the system from each telecommunication system source of a plurality of telecommunication system sources that are channel agnostic, channel agnostic data indicating interactions between a first customer and the telecommunication system source;
   store, by the system in a data store, the channel agnostic data received from each telecommunication system source of the plurality of telecommunication system sources, the channel agnostic data being stored in association with an identifier of the first customer;
   query, by the system, the data store with the identifier of the first customer to retrieve the channel agnostic data received from each telecommunication system source of the plurality of telecommunication system sources that is associated with the first customer;
   determine, by the system, a customer management-related end user to which the activity feed is to be displayed;
   determine, by the system, an authority tag of the end user;
   determine, by the system, which channel agnostic data retrieved from the data store is accessible to the end user, based on the authority tag of the end user;
   generate, by the system, an activity feed that aggregates the channel agnostic data retrieved from the data store that is accessible to the end user,
   wherein the retrieved channel agnostic data is sorted within the activity feed based on at least one of flagged items or event dates;
   cause display, by the system on demand in a customer management user interface, of the activity feed to the end user; and
   implement, by the system, at least one action based on the retrieved channel agnostic data, the at least one action including automatically taking steps to rectify an issue identified in the activity feed.

* * * * *